United States Patent
Kassube et al.

(10) Patent No.: US 10,011,173 B2
(45) Date of Patent: Jul. 3, 2018

(54) POWERTRAIN SYSTEM FOR MAINTAINING RIMPULL PERFORMANCE OF MACHINE

(71) Applicant: Caterpillar Inc., Peoria, IL (US)

(72) Inventors: Chad L. Kassube, Peoria, IL (US); Balmes Tejeda, Peoria, IL (US); Corwin E. Storer, Bartonville, IL (US)

(73) Assignee: Caterpillar Inc., Deerfield, IL (US)

( * ) Notice: Subject to any disclaimer, the term of this patent is extended or adjusted under 35 U.S.C. 154(b) by 310 days.

(21) Appl. No.: 15/068,647

(22) Filed: Mar. 14, 2016

(65) Prior Publication Data

US 2016/0193916 A1   Jul. 7, 2016

(51) Int. Cl.
  *B60K 17/10*  (2006.01)
  *B60K 17/354*  (2006.01)
  *B60K 23/08*  (2006.01)

(52) U.S. Cl.
  CPC .......... *B60K 17/354* (2013.01); *B60K 17/10* (2013.01); *B60K 23/0808* (2013.01); *B60W 2510/0657* (2013.01); *B60W 2520/26* (2013.01); *B60W 2520/40* (2013.01); *B60W 2520/403* (2013.01); *B60Y 2200/411* (2013.01)

(58) Field of Classification Search
  None
  See application file for complete search history.

(56) References Cited

U.S. PATENT DOCUMENTS

| | | | |
|---|---|---|---|
| 4,183,419 A | 1/1980 | Henn et al. | |
| 4,594,666 A | 6/1986 | Cornell | |
| 6,161,642 A * | 12/2000 | Imai | B60K 17/354 180/24.1 |
| 7,195,580 B2 | 3/2007 | Funato et al. | |
| 7,540,825 B2 | 6/2009 | Hofer et al. | |
| 7,769,520 B2 | 8/2010 | Ryderstam et al. | |
| 8,036,797 B2 | 10/2011 | Johnson et al. | |
| 8,534,409 B2 * | 9/2013 | Sigmund | B60K 23/0808 180/247 |
| 9,435,324 B2 * | 9/2016 | Richardson | F04B 17/03 |
| 9,750,191 B2 * | 9/2017 | Richardson | A01D 69/025 |
| 2006/0004509 A1 * | 1/2006 | Teslak | B60K 6/12 701/84 |
| 2006/0178792 A1 * | 8/2006 | Ortiz | B60R 16/0234 701/29.1 |

(Continued)

*Primary Examiner* — William Kelleher
*Assistant Examiner* — Gregory Prather

(57) ABSTRACT

A powertrain system for a machine is described. The powertrain system includes a power source configured to provide a torque output. The powertrain system further includes a first drivetrain coupled to the power source, to drive a first set of ground engaging members, and a second drivetrain coupled to the power source to drive the second set of ground engaging members. The powertrain system further includes a controller having one or more lug curve maps defining a maximum allowed torque value of the power source for a current operating condition of the machine. The controller is configured to determine a parasitic load due to the second drivetrain, and adjust the torque output of the power source based on the determined parasitic load to maintain a rimpull performance of the machine, where the adjusted torque output is limited by the maximum allowed torque value.

1 Claim, 3 Drawing Sheets

(56) References Cited

U.S. PATENT DOCUMENTS

| | | | |
|---|---|---|---|
| 2008/0086254 A1* | 4/2008 | Anderson | B60K 6/12 701/93 |
| 2008/0173101 A1* | 7/2008 | Sowle | G01M 17/007 73/862.09 |
| 2008/0236919 A1* | 10/2008 | Iund | B60K 6/46 180/69.6 |
| 2009/0118085 A1* | 5/2009 | Heap | B60K 6/365 477/5 |
| 2009/0118934 A1* | 5/2009 | Heap | B60K 6/26 701/54 |
| 2009/0118936 A1* | 5/2009 | Heap | B60K 6/26 701/54 |
| 2009/0118939 A1* | 5/2009 | Heap | B60K 6/26 701/54 |
| 2009/0118962 A1* | 5/2009 | Heap | B60K 6/26 701/99 |
| 2009/0118971 A1* | 5/2009 | Heap | B60K 6/365 701/102 |
| 2011/0065543 A1* | 3/2011 | Usoro | B60K 6/365 475/5 |
| 2012/0167555 A1* | 7/2012 | Frazier | B60W 10/06 60/274 |
| 2013/0013158 A1 | 1/2013 | Weber et al. | |
| 2013/0237360 A1* | 9/2013 | DeLucia | B60K 6/52 475/5 |
| 2014/0046538 A1* | 2/2014 | Siegel | G05B 11/32 701/36 |
| 2014/0080660 A1 | 3/2014 | Zhang et al. | |
| 2014/0136058 A1* | 5/2014 | Velde | F16H 61/00 701/50 |
| 2015/0105992 A1 | 4/2015 | Larsson et al. | |
| 2015/0203117 A1* | 7/2015 | Kelly | B60K 31/02 701/91 |
| 2015/0218779 A1* | 8/2015 | Mitchell | E02F 9/0841 701/50 |
| 2015/0329099 A1* | 11/2015 | Zawacki | B60G 17/052 701/37 |
| 2015/0336584 A1 | 11/2015 | Bakken et al. | |
| 2016/0193916 A1* | 7/2016 | Kassube | B60K 17/354 74/664 |
| 2016/0339779 A1* | 11/2016 | Lauffer | B60K 17/344 |
| 2017/0001518 A1* | 1/2017 | Pritchard | B60K 17/344 |
| 2017/0227074 A1* | 8/2017 | Povirk | B60K 17/346 |
| 2018/0052078 A1* | 2/2018 | Newberger | G01M 15/05 |

* cited by examiner

US 10,011,173 B2

POWERTRAIN SYSTEM FOR MAINTAINING RIMPULL PERFORMANCE OF MACHINE

TECHNICAL FIELD

The present disclosure relates to a powertrain system for a machine, and more particularly, to a powertrain system configured to maintain a rimpull performance of the machine under varying operating conditions.

BACKGROUND

Earth moving equipment, such as a motor grader for example, often operates in environments with poor underfoot conditions. Some earth moving machines are equipped with an all-wheel drive system so that front wheels of the machine, normally used for steering, can also be engaged and driven to help propel the machine. Normally, only rear wheels are driven, but when poor underfoot conditions are encountered causing excessive wheel slip, the front wheels of the machine can also be driven to increase traction of the machine, and thereby reducing slip and maintaining directional control in the machine.

For some earth moving equipment like a motor grader, such all-wheel drive system, typically, includes a mechanical drivetrain for the rear wheels and a hydrostatic drivetrain for engaging the front wheels. However, it is generally known that the hydrostatic drivetrain is inherently less efficient than the mechanical drivetrain, in an all-wheel drive system application. Parasitic loads due to inefficiency of the hydrostatic drive, in combination with the poor underfoot conditions, may affect a rimpull performance of the machine, when the hydrostatic drive is enabled.

US Patent Publication Number 20130013158, hereinafter referred to as the '158 publication, relates to a control arrangement for vehicles, in particular for motor graders. The control arrangement provides a drive motor, driven rear wheels coupled to the drive motor and further wheels, connectable via allocated hydraulic motors and which are activated by a hydraulic pump coupled to a drive motor and has an adjustable feed volume. The '158 publication provides that the control arrangement includes a sensor to detect rotational speed of the rear wheels and a sensor to detect the rotational speed of the drive motor. The control arrangement further includes an electronic control device configured to receive the rotational speed signals of the rear wheels and the drive motor and which controls the hydraulic motors as a function of the rotational speed. The '158 publication further provides that the hydraulic pump and the hydraulic motors can be activated electrically and adjusted in a continuously variable fashion and the hydraulic pump is connected directly, without valves, to the hydraulic motors in parallel by hydraulic lines. Further, a control device controls the respective displacement volume of the hydraulic motors only as a function of the rotational speed signals of the sensors.

With such an arrangement, the control arrangement of the '158 publication tries to control the individual distribution of displacement values for the hydraulic motors and the hydraulic pump, and to enable connection and disconnection of a hydrostatic auxiliary drive while the machine is in motion. However, the '158 publication does not consider any losses that are incurred by the drive motor when the hydrostatic auxiliary drive is connected, and neither does the '158 publication considers the reduction in a rimpull performance of the machine when the hydrostatic auxiliary drive is connected.

SUMMARY OF THE DISCLOSURE

In one aspect of the present disclosure, a powertrain system for a machine is described. The powertrain system includes a power source configured to provide a torque output. The powertrain system further includes a first drivetrain coupled to the power source, to drive a first set of ground engaging members, and a second drivetrain coupled to the power source to drive the second set of ground engaging members. The power-train system further includes a controller having one or more lug curve maps defining a maximum allowed torque value of the power source for a current operating condition of the machine. The controller is configured to determine a parasitic load due to the second drivetrain, and adjust the torque output of the power source based on the determined parasitic load to maintain a rimpull performance of the machine, where the adjusted torque output is limited by the maximum allowed torque value.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
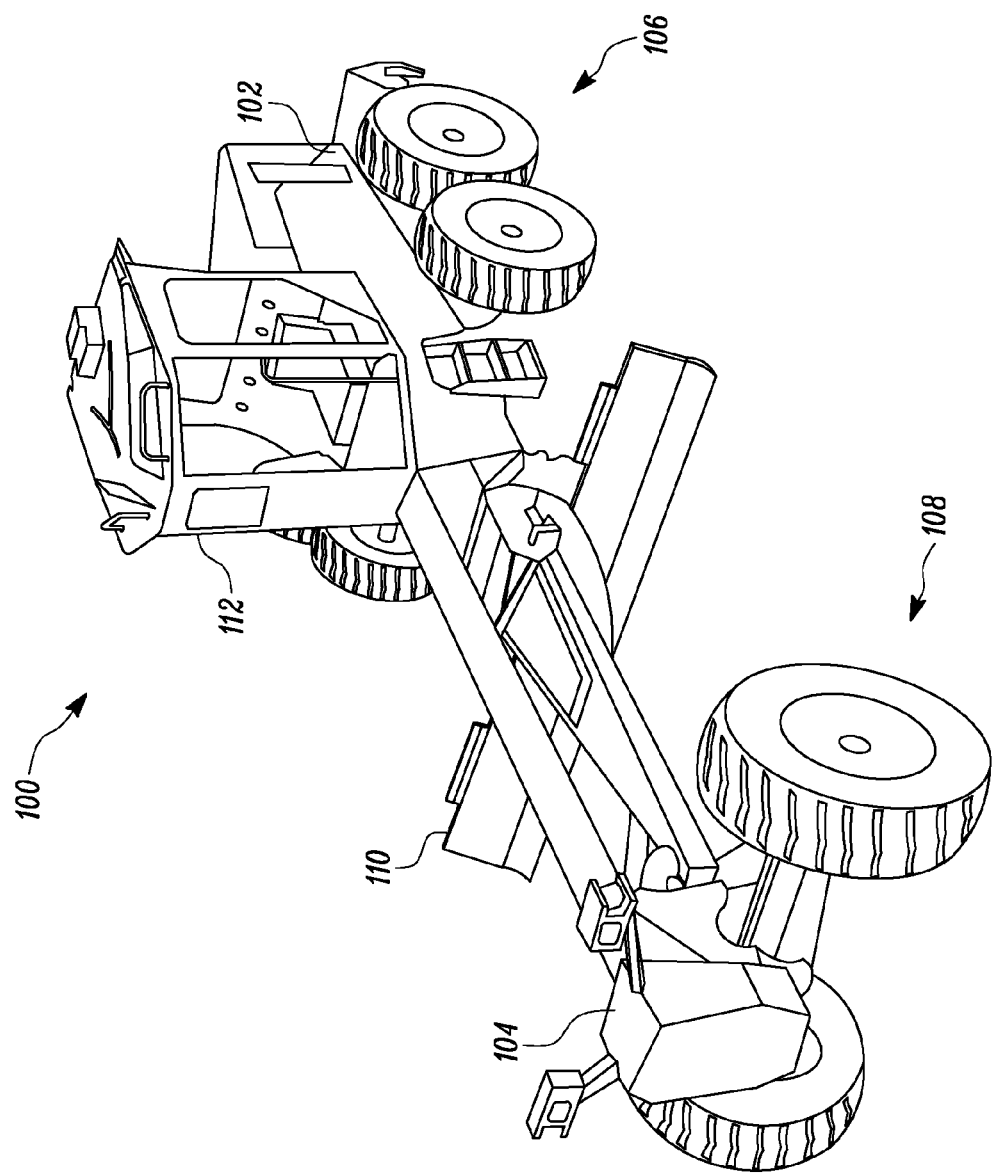
FIG. 1 illustrates a perspective view of a machine, in accordance with an embodiment of the present disclosure.

FIG. 1 illustrates a perspective view of a machine, generally represented by numeral 100, in accordance with an embodiment of the present disclosure. In the illustration of FIG. 1, the machine 100 is a motor grader. A person of ordinary skill in the art will appreciate that the machine 100 depicted in the accompanied figures is merely exemplary and that the present disclosure may be applied to any number of different types of machines used in construction, transportation, agriculture, and similar industries. For example, the machine 100 may be a wheel harvester, a wheel skidder, a four-wheel drive vehicle, a wheel loader, or any other similar machine.

As illustrated, the machine 100 includes a rear frame 102 and a front frame 104 movably coupled with the rear frame 102, to support various assemblies. In one example, the front frame 104 is pivotally coupled with the rear frame 102 such that the front frame 104 may rotate relative to the rear frame 102. The machine 100 further includes ground engaging members, specifically a first set of ground engaging members 106 mounted on the rear frame 102 and a second set of ground engaging members 108 mounted on the front frame 104. The ground engaging members 106, 108 provides mobility to the machine 100. In the illustrated embodiment, the machine 100 is suspended on the ground engaging members 106, 108, such as wheels. In alternative examples, ground engaging members may include continuous tracks, belts, propellers, etc. To propel and direct the machine 100 with respect to the ground, at least one set of the ground engaging members, typically the first set of ground engaging members 106 may be power-driven to rotate and/or another set, typically the second set of ground engaging members 108 may be steerable by an operator onboard the machine 100, remotely, or by another control scheme.

It may be seen that the front frame 104 is in the form of a forwardly extending beam defining a front end supported on the second set of ground engaging members 108 and a rear end pivotally coupled with the rear frame 102, such that the front frame 104 may rotate relative to the rear frame 102. Also, the first set of ground engaging members 106 is shown to include four wheels, while the second set of ground engaging members 108 is shown to only include two wheels. However, it may be contemplated that such configuration is exemplary only and the machine 100 may have any suitable arrangement for the ground engaging members 106, 108.

The machine 100 of the present disclosure is capable of alternating between high-speed, over-the-road travel and heavy, load-engaging operations. For load-engaging operation, the machine 100 includes an implement 110 supported on the front frame 104. The implement 110 may be power adjusted for flattening or smoothing a worksite surface and/or pulling some load along therewith. The machine 100 further includes an operator cabin 112 supported on the rear frame 102. The operator cabin 112 may provide an operator interface (not shown), which may include one or more input devices like accelerator, braking pedal, steering, joystick, knobs, levers, switches, display devices and so on. The input devices may be used for operating and controlling one or more parameters of the machine 100. For example, the input devices may be operable for controlling propulsion of the machine 100 and/or operation of the implement 110. The operator interface may also include one or more output devices like a display screen, a warning light, a haptic feedback arrangement, etc.

Figure 2:
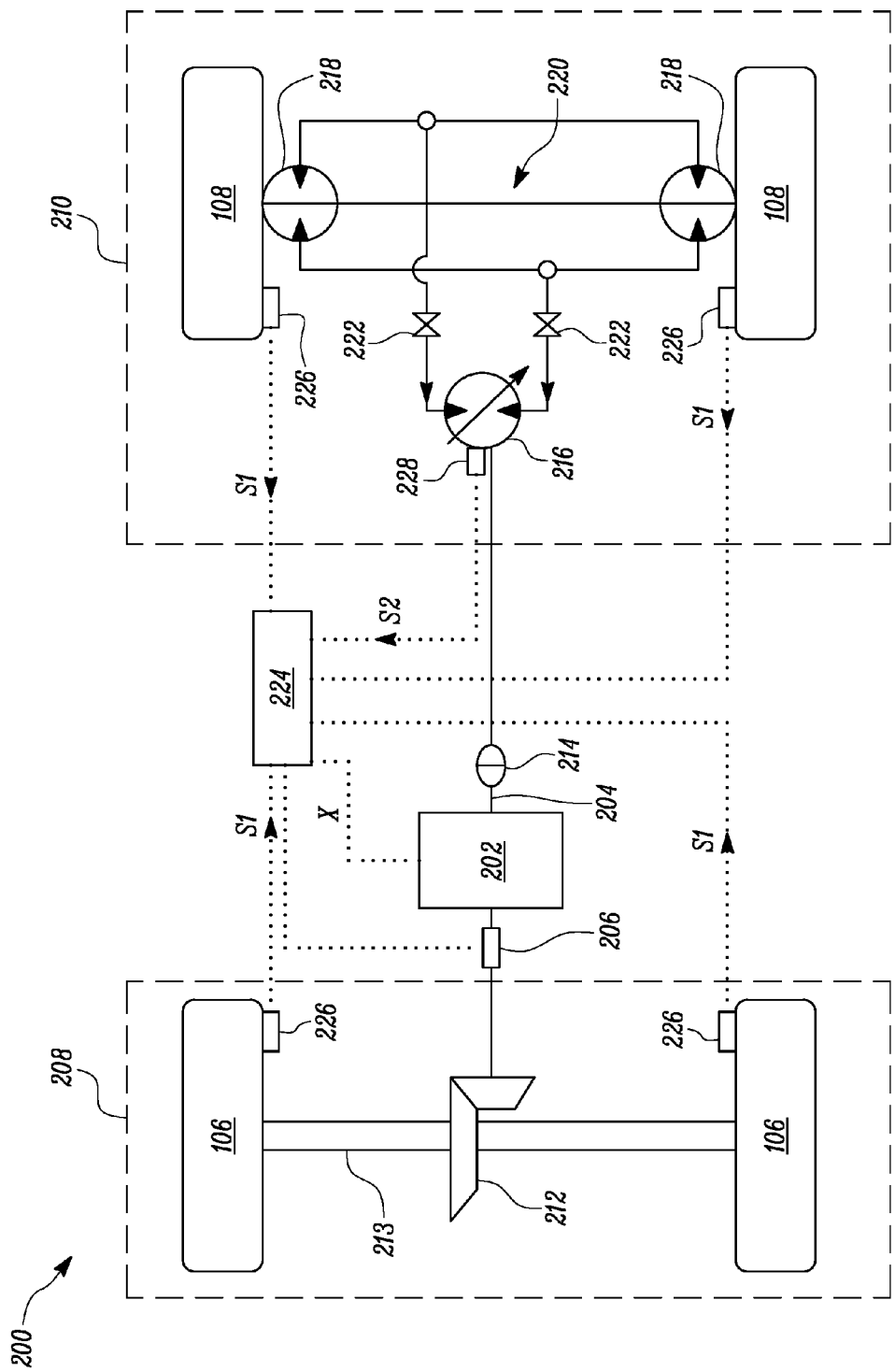
FIG. 2 illustrates a schematic block diagram of a power drivetrain system for the machine of FIG. 1, in accordance with the embodiment of the present disclosure.

The machine 100 further includes a powertrain system, schematically shown in FIG. 2 and referenced by numeral 200. It may be seen that FIG. 2 only shows two wheels for the first set of ground engaging members 108, instead of four wheels as shown in FIG. 1, for simplification purposes. The powertrain system 200 includes a power source 202 to provide power to the machine 100 for operational and mobility requirements, and in particular to provide a torque output. Generally, the power source 202 may be mounted on the rear frame 102 of the machine 100. The power source 202 may be an internal combustion engine, an electric motor, power storage device like batteries, a hybrid engine, a turbine, a solar powered engine, or any other suitable power source known in the art. In one example, the power source 202 may be an internal combustion engine, such as a compression ignition diesel engine, that burns a hydrocarbon-based fuel or another combustible fuel source to convert the potential or chemical energy therein to mechanical power that may be utilized for other work.

In one example, the power source 202 produces rotational power that may rotate a power source output 204, such as a drive shaft, extending from the power source 202. The power produced by the power source 202 may be quantifiable as speed and/or torque delivered through the power source output 204. The possible speed and torque outputs may in part be a function of the design of the power source 202 including dimensional parameters, displacement, etc. The speed and, therefore, the torque produced may be selectively varied to an extent by adjusting the operating parameters and inputs to the power source 202. To measure the speed and/or torque, a power source sensor 206 of any appropriate design may be associated with the power source output 204. In one example, the power source sensor 206 may be a magnetic pickup type sensor that may sense a rotating magnetic field associated with a rotating component of the power source output 204, such as a flywheel or drive shaft. In other examples, the power source sensor 206 may be an optical pickup sensor that optically reads a visual indication on the rotating component.

The powertrain system 200 also includes a first drivetrain 208 coupled to the power source 202 and the first set of ground engaging members 106. The first drivetrain 208 transmits the torque output from the power source 202 to the first set of ground engaging members 106. The first drivetrain 208 may be a hydraulic drivetrain, mechanical drivetrain, a hydro-mechanical drivetrain, an electric drivetrain, or any other suitable drivetrain known in the art. In the illustrated example, the first drivetrain 208 is a mechanical drivetrain. In such case, the first drivetrain 208 may include a differential 212 operatively coupled to the power source output 204, which in turn may be coupled to an axle 213 to drive the first set of ground engaging members 106. In some examples, the first drivetrain 208 may also include one or more gears, shafts, torque convertor, motor, and so on, disposed between the power source 202 and the first set of ground engaging members 106.

The powertrain system 200 further includes a second drivetrain 210. In one example, as illustrated, the second drivetrain 210 is coupled to the power source 202, via a coupling 214, such as a universal joint, a driveshaft, a gear train, a viscous coupling, a hydraulically controlled coupling, etc. In closed position of the coupling 214, the machine 100 is operated in All-Wheel Drive (AWD) mode in which the second drivetrain 210 drives the second set of ground engaging members 108 using the torque output from the power source 202. In one example, the second drivetrain 210 is a hydrostatic drivetrain and includes a hydraulic pump 216 coupled to a set of hydraulic motors 218, through fluid transfer lines 220 and one or more control valves 222. The hydraulic pump 216, whose flow is moderated by the control valve 222, provides the set of hydraulic motors 218 with pressurized fluid to drive the second set of ground engaging members 108. The control valve 222 may include a flow divider which directs the flop/to the individual wheels, in the second set of around engaging members 108, requiring it. The control valve 222 may also include directional flow valves for forward and reverse directions, as well as a "free-wheeling" valve which enable the second set of ground engaging members 108 to remain passive when the first set of ground engaging members 106 are engaged and other situations as needed. It may be seen that the coupling 214, specifically, engages the power source 202 and the hydraulic pump 216, in closed position, and the torque output from the power source 202 is received by the hydraulic pump 216, in the second drivetrain 210.

The hydraulic pump 216 may be a variable displacement, variable delivery, fixed displacement, swash plate or any other suitable pump configuration known in the art. The hydraulic pump 216 may convert the torque output of the power source 202 to hydraulic pressure by pressurizing the hydraulic fluid in the fluid transfer lines 220. The fluid transfer lines 220 direct the pressurized hydraulic fluid to the hydraulic motors 218 to rotate an associated impeller or the like and reconvert the hydraulic pressure to a rotational output. Further, the hydraulic motors 218 may be connected by separate clutches (not shown) to the second set of ground engaging members 108. An effective gear ratio of the second drivetrain 210 may be altered by, for example, varying the displacement of the hydraulic pump 216 or changing the resistance of the fluid transfer lines 220. Hydraulic displacement and/or resistance may be varied continuously within the operational limits to provide an infinite number of effective gear ratios.

Referring again to FIG. 2, the powertrain system 200 also includes a controller 224. The controller 224 may be a logic unit using one or more integrated circuits, microchips, microcontrollers, microprocessors, all or part of a Central Processing Unit (CPU), Graphics Processing Unit (GPU), Digital Signal Processor (DSP), Field Programmable Gate Array (FPGA), or other circuits suitable for executing instructions or performing logic operations. It will be appreciated that other peripheral circuitry such as buffers, latches, switches and so on may be implemented within the controller 224 or separately as desired. Various other circuits may also be associated with the controller 224, such as power supply circuitry, signal conditioning circuitry, solenoid driver circuitry, and other types of circuitry. Further it may be understood that the controller 224 may be associated with a software product stored on a non-transitory computer readable memory (not shown) and comprising data and computer implementable instructions. The non-transitory computer readable medium may include a memory, such as RAM, ROM, flash memory, a hard drive, etc. The computer readable memory may also be configured to store electronic data associated with operation of the machine 100.

In one example, the controller 224 controls the engagement and disengagement of the second drivetrain 210 with the power source 202. For this purpose, the powertrain system 200 may include a first sensor 226 to detect a low level of traction between the ground engaging members, specifically the first set of ground engaging members 106 and the ground. The first sensor 226 detects the low level of traction by checking if one or more driven wheels are spinning significantly faster or slower than another. It may be understood that the first sensor 226 may include multiple sensors coupled with each of the ground engaging members 106, 108. When the low level of traction is detected, the first sensor 226 sends a first signal 'S1' to the controller 224. The controller 224, in response to receiving the first signal 'S1', sends a command 'X' to the coupling 214, and further to the hydraulic pump 216, to engage the second drivetrain 210 with the power source 202 in order to drive the second set of ground engaging members 108, and thereby increase the traction between the machine 100 and the ground.

Further, the powertrain system 200 may include a second sensor 228 to determine parasitic loads caused by the engagement of the second drivetrain 210 with the power source 202, i.e. during the AWD mode. The second sensor 228 may determine the pressure drop in the fluid transfer lines 220 as the hydraulic fluid is passed from the hydraulic pump 216 to the hydraulic motors 218, and generate a signal 'S2' corresponding to the pressure drop. Such arrangements for determining the pressure drop are widely known in the art and have not been described herein for the brevity of the disclosure. It may be understood that the pressure drop of the hydraulic fluid may be the cause of the parasitic loads and therefore the signal 'S2' may be construed as indicative of the parasitic loads caused by the engagement of the second drivetrain 210 with the power source 202, in the machine 100. Alternatively, the second sensor 228 may determine the displacement and/or the discharge pressure of the hydraulic pump 216 to determine the parasitic loads. In some example, the data from the power source sensor 206 may also be used to determine the parasitic loads.

Figure 3:
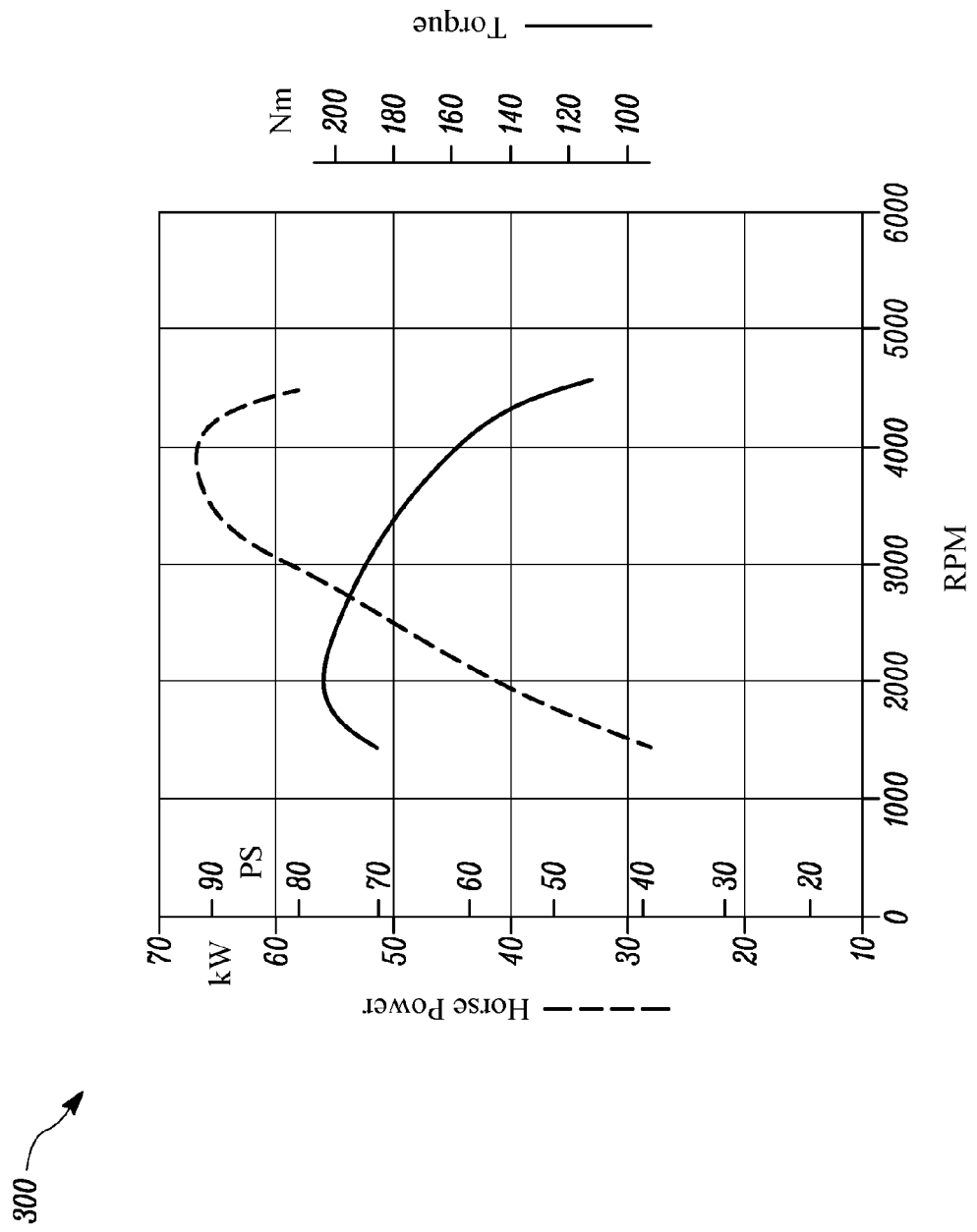
FIG. 3 illustrates an exemplary graph to represent lug curve maps, in accordance with the embodiment of the present disclosure.

In one example, the controller 224 is also disposed in signal communication with the power source 202. The controller 224 adjusts the torque output of the power source 202 based on the received signals 'S1' and S2'. The torque output adjustment of a power source, such as an engine, can be achieved by varying methods such as increasing the fuel flowrate or the like. Such methods are widely known in the art, and have not been described herein for the brevity of the disclosure. Further, in one example, the controller 224 includes lug curves maps 300, example of which is shown in FIG. 3, stored in a non-transitory memory (not shown) of the controller 224. Those of skill in the art sometimes refer to the lug curves maps as torque curves. The lug curves maps 300 define a preset maximum allowed torque value of the power source 202 for a current operating condition of the machine 100, specifically in terms of RPM at the power source output 204. In addition, the lug curves maps 300 also define a maximum power output of the power source 202 for the given RPM at the power source output 204. The lug curves maps 300 represents the maximum torque output that the power source 202 may produce at a given set of operating conditions of the machine 100. In other words, the power source 202 operates within the area under the lug curves maps 300.

INDUSTRIAL APPLICABILITY

The machine 100, such as a motor grader, has usually a long construction. The second drivetrain 210, on the one hand, has the advantage that it achieves a stabilization of this rather long construction of the machine 100, and on the other hand, the second drivetrain 210 transfers more traction to the ground under unfavorable ground conditions, like sludge, snow or ice. For example, if the machine 100 driven by the first set of ground engaging members 106 and pulling a load by the implement 110 suddenly encounters poor underfoot conditions along a travel path, in such case, the powertrain system 200 of the present disclosure engages the second drivetrain 210 to also drive the second set of ground engaging members 108. This is done so as to take full advantage of the weight of the machine 100, and thereby improve traction between the machine 100 and the ground.

However, the second drivetrain 210, usually being a hydrostatic drivetrain, although cost effective, may be inherently less efficient compared to a mechanical drivetrain or the like. The second drivetrain 210 may introduce parasitic loads in the powertrain system 200 which affects the rimpull performance of the machine 100, i.e. the ability to pull the load by the machine 100, and therefore affects the overall productivity of the machine 100. Parasitic loads are a concern with all hydraulic systems, including closed-loop circuits. A major contributor to such parasitic loads is the wasted hydraulic power due to the pressurized hydraulic fluid flow being throttled across the control valve 222 or the like. This can occur under operating conditions where the pressurized flow is substantially greater than that required for the current operating conditions.

Some of the known AWD systems, though, statically adjust the torque output of the power source with the engagement of the second drivetrain, but mostly the parasitic loads caused by the second drivetrain as its being commanded in a particular machine state are not factored in, which leads to reduction in a rimpull performance of the machine or excessive torque through the mechanical drivetrain. The powertrain system 200 of the present disclosure, in particular the controller 224, firstly, detects the poor underfoot conditions by using the first sensor 226, as described above, and engages the second drivetrain 210 if such conditions are detected. The controller 224 also determines the power/torque requirement of the second drivetrain 210 and dynamically adjusts the torque output of the power source 202 to compensate for the increase in demand of the torque output due to the engagement of the second drivetrain 210. The controller 224 also determines the parasitic loads as a result of the engagement of the second drivetrain 210, as discussed above, and increases the torque output of the power source 202 to compensate for these parasitic loads, and thereby maintains a rimpull performance of the machine 100 during the poor underfoot conditions or similar conditions.

As discussed, the lug curves maps 300 define the preset value of maximum allowable torque output of the power source 202. The controller 224 of the present disclosure further considers this maximum allowable torque output value, and limits the torque output of the power source 202 up to this torque output value. That is, the controller 224 compares the required torque output as determined to compensate for the engagement of the second drivetrain 210 and the parasitic loads, and the maximum allowable torque output value defined by the lug curves maps 300; and selects the minimum of the two torque output values. The selected torque output helps to avoid any damage to the power source 202 due to increased loads and thus increases the life span of the power source 202, and further helps to check the emissions of the power source 202, such as in case of the power source 202 being an engine or the like.

While aspects of the present disclosure have been particularly shown and described with reference to the embodiment above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based by the claim and any equivalents thereof.

What is claimed is:

1. A powertrain system for a machine having a first set of ground engaging members and a second set of ground engaging members, the powertrain system comprising:
    a power source configured to provide a torque output;
    a first drivetrain coupled to the power source and configured to drive the first set of ground engaging members using the torque output from the power source;
    a second drivetrain coupled to the power source, the second drivetrain configured to drive the second set of ground engaging members using the torque output from the power source when coupled therewith; and
    a controller in signal communication with the first drivetrain and the second drivetrain, the controller including one or more lug curve maps defining a maximum allowed torque value of the power source for a current operating condition of the machine, the controller configured to:
        determine a parasitic load due to the second drivetrain when coupled to the power source; and
        adjust the torque output of the power source based at least in part on the determined parasitic load to maintain a rimpull performance of the machine, the adjusted torque output being limited by the maximum allowed torque value.

* * * * *